(12) United States Patent
Li et al.

(10) Patent No.: US 12,142,949 B2
(45) Date of Patent: Nov. 12, 2024

(54) SHIELDING FILM, COIL ASSEMBLY, AND WIRELESS CHARGING DEVICE

(71) Applicant: HUAWEI DIGITAL POWER TECHNOLOGIES CO., LTD., Shenzhen (CN)

(72) Inventors: Yuechao Li, Dongguan (CN); Chao Yang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 687 days.

(21) Appl. No.: 17/490,150

(22) Filed: Sep. 30, 2021

(65) Prior Publication Data

US 2022/0021246 A1    Jan. 20, 2022

Related U.S. Application Data

(63) Continuation of application No. PCT/CN2020/109649, filed on Aug. 17, 2020.

(30) Foreign Application Priority Data

Feb. 28, 2020  (CN) .......................... 202010128231.6

(51) Int. Cl.
*H01F 27/28*  (2006.01)
*H01F 27/36*  (2006.01)
(Continued)

(52) U.S. Cl.
CPC .......... *H02J 50/70* (2016.02); *H01F 27/2885* (2013.01); *H01F 27/36* (2013.01);
(Continued)

(58) Field of Classification Search
CPC .... H01F 27/2885; H01F 27/36; H01F 27/363; H01F 38/14
See application file for complete search history.

(56) References Cited

U.S. PATENT DOCUMENTS

| | | | | |
|---|---|---|---|---|
| 2015/0102892 | A1* | 4/2015 | Yeo | H02J 50/70 336/200 |
| 2016/0345471 | A1* | 11/2016 | Cho | H01F 27/36 |

(Continued)

FOREIGN PATENT DOCUMENTS

| | | |
|---|---|---|
| CN | 106170196 A | 11/2016 |
| CN | 106602735 A | 4/2017 |

(Continued)

OTHER PUBLICATIONS

Office Action issued in CN202010128231.6, dated Mar. 30, 2021, 10 pages.

(Continued)

*Primary Examiner* — Malcolm Barnes

(57) ABSTRACT

A shielding film includes a first film layer. The first film layer includes a first conductive part and a first insulating part, and the first insulating part penetrates the first conductive part in a thickness direction of the first film layer. Under electromagnetic influence of a first electromagnetic field, a first eddy current is formed in the first film layer, and a loop of the first eddy current is located in the first conductive part, so that the first eddy current has relatively high current intensity. Under electromagnetic influence of a second electromagnetic field, a second eddy current is formed in the first film layer, and a loop of the second eddy current passes through the first insulating part, so that current intensity of the second eddy current can be reduced.

11 Claims, 7 Drawing Sheets

(51) Int. Cl.
  *H01F 38/14* (2006.01)
  *H02J 50/00* (2016.01)
  *H02J 50/10* (2016.01)
  *H02J 50/70* (2016.01)
(52) U.S. Cl.
  CPC ........... *H01F 27/363* (2020.08); *H01F 38/14* (2013.01); *H02J 50/005* (2020.01); *H02J 50/10* (2016.02)

(56) References Cited

U.S. PATENT DOCUMENTS

2016/0345472 A1* 11/2016 Park ................. H02J 50/10
2018/0352688 A1   12/2018 Jang et al.

FOREIGN PATENT DOCUMENTS

| CN | 108370085 | A | 8/2018 | | |
|----|-----------|---|--------|---|---|
| CN | 108430204 | A | 8/2018 | | |
| CN | 108780696 | A | 11/2018 | | |
| CN | 110112840 | A | 8/2019 | | |
| CN | 209516750 | U | 10/2019 | | |
| CN | 111277053 | A | 6/2020 | | |
| WO | WO-2017215388 | A1 * | 12/2017 | ........... | B32B 17/061 |
| WO | WO-2018021623 | A1 * | 2/2018 | ............. | C09J 11/04 |

OTHER PUBLICATIONS

International Search Report and Written Opinion issued in PCT/CN2020/109649, dated Nov. 27, 2020, 5 pages.
European Search Report for Application No. 20921137.4 dated Apr. 14, 2022, 7 pages.
European Patent Office Communication dated Aug. 31, 2022 for Application No. 20921137.4, 5 pages.

* cited by examiner

SHIELDING FILM, COIL ASSEMBLY, AND WIRELESS CHARGING DEVICE

CROSS-REFERENCE TO RELATED APPLICATIONS

This application is a continuation of International Application No. PCT/CN2020/109649, filed on Aug. 17, 2020, which claims priority to Chinese Patent Application No. 202010128231.6, filed on Feb. 28, 2020. The disclosures of the aforementioned applications are hereby incorporated by reference in their entireties.

TECHNICAL FIELD

This application relates to the field of electromagnetic device technologies, and in particular, to a shielding film, a coil assembly, and a wireless charging device.

BACKGROUND

At present, wireless charging technologies are mainly divided into three categories: magnetic induction wireless charging, magnetic resonance wireless charging, and radio frequency wireless charging. In the current market, wireless charging based on magnetic induction wireless charging technology has a high share. With popularization of wireless charging technologies, many products that use magnetic induction wireless charging technology are emerging in the market. For example, the magnetic induction wireless charging technology is widely used in electronic devices such as a wireless charger and a mobile phone to perform charging. However, a charging time (rate) of the mobile phone is always a key issue of user experience. The charging rate of the mobile phone can be improved by improving output power of the wireless charger. However, with an increase of the output power, electromagnetic radiation increases. This reduces safety of the electronic device and use safety of a user, and also affects regulatory certification of the product. In addition, the wireless charging technology relies on an electromagnetic field to transmit energy, and a conventional electromagnetic shielding technology completely blocks transmission of electromagnetic field energy. Therefore, the conventional electromagnetic shielding technology affects normal transmission of electromagnetic energy in the wireless charging product.

SUMMARY

This application provides a shielding film, a coil assembly, and a wireless charging device that can effectively shield a high-frequency electromagnetic signal and effectively conduct a low-frequency electromagnetic signal.

According to one aspect, an embodiment of this application provides a shielding film, including a first film layer. The first film layer includes a first conductive part and a first insulating part, and the first insulating part penetrates the first conductive part or the first conductive part penetrates the first insulating part in a thickness direction of the first film layer. Under the influence of a magnetic field of a first electromagnetic field, a first eddy current is formed in the first film layer, and a loop of the first eddy current is located in the first conductive part, so that the first eddy current has relatively high current intensity. Under the influence of a magnetic field of a second electromagnetic field, a second eddy current is formed in the first film layer, and a loop of the second eddy current passes through the first insulating part, so that current intensity of the second eddy current can be reduced. When a frequency of the first electromagnetic field is greater than a frequency of the second electromagnetic field, a loop area of the first eddy current is less than a loop area of the second eddy current. By using an eddy current loss effect, the shielding film provided in this embodiment of this application can effectively absorb and shield a high-frequency electromagnetic field, and does not attenuate a low-frequency electromagnetic field, thereby achieving an effect of blocking a high-frequency electromagnetic field and conducting a low-frequency electromagnetic field.

Under the influence of a magnetic field of an electromagnetic field (for example, when there is an electromagnetic coil generating an electromagnetic field on one side of the shielding film), an eddy current is generated in the shielding film. Generally, electromagnetic fields generated by the electromagnetic coil include a high-frequency electromagnetic field and a low-frequency electromagnetic field. In electromagnetic fields with different frequencies, eddy current loops formed in the shielding film are different in size. Specifically, in the high-frequency electromagnetic field, a loop path of an eddy current formed in the shielding film is small. In the low-frequency electromagnetic field, a loop path of an eddy current formed in the shielding film is large. Based on the foregoing feature, the shielding film provided in this embodiment of this application can effectively absorb and shield a high-frequency electromagnetic field, and can well conduct a low-frequency electromagnetic field.

In example implementations, the first conductive part may be made of various materials. For example, the first conductive part may include a metal or an alloy such as copper or aluminum, or may include graphene or carbon fiber. The first insulating part may also be made of various materials, for example, including air, polyamide, polycarbonate, tetrafluoroethylene, polytetrafluoroethylene, or a mixture of a plurality of insulating materials.

In addition, a quantity of first conductive parts, a quantity of second conductive parts, a structural form of the first film layer, and a manner of forming a conductive unit are varied.

For example, the first conductive part may be an entire body, and the first insulating part may be a plurality of through-hole structures disposed on the first conductive part. During manufacturing, carbon fiber felt, a metal film, conductive paper, or the like may be selected as a substrate, and then a through-hole structure is disposed on the metal film by using a process such as needling or laser etching, to implement preparation of the first film layer. A minimum region surrounded by a plurality of insulating parts may be used as a conductive unit. For example, a plurality of first insulating parts may be evenly distributed in the first conductive part in a matrix form, and every four first insulating parts may surround one conductive unit.

In addition, in some implementations, the first insulating part may be an entire body, and the first conductive part may be a conductor distributed in the first insulating part. Alternatively, in some implementations, a plurality of first insulating parts may be disposed, and a plurality of first conductive parts may be disposed.

In addition, to improve structural strength of the first film layer, the first insulating part may be an insulating material with relatively good structural stability. Alternatively, in some implementations, an insulation layer may be disposed on a surface of the first film layer.

When the shielding film implements a shielding function, there is a current in the first conductive part. Therefore, a temperature of the first conductive part increases. In an example implementation, to improve heat dissipation of the shielding film, the first insulating part may include an insulating material with good thermal conductivity. Alternatively, in some implementations, a thermally conductive insulation layer may be disposed on a surface of the first film layer.

In addition, the first film layer may alternatively be manufactured by using a weaving process. Specifically, a metal wire may be selected as a woven material, and metal wires may be woven into a mesh structure or a linear structure. A hollow-out part of the mesh structure may be used as a first insulating part, and metal wires around each first insulating part may form one conductive unit. In an example implementation, the mesh structure (or the hollow-out part) may be a rectangular structure, a rhombus structure, or the like. This is not specifically limited in this application. In addition, in some implementations, an insulating material, a thermally conductive insulating material, or the like may be further coated on a surface of the mesh structure, to improve structural strength or heat dissipation performance of the first film layer. In addition, in some implementations, a metal wire wrapped with an insulation layer or a thermally conductive insulation layer may be selected as a woven material, or an insulating wire wrapped with a conductive layer may be selected as a woven material. This is not specifically limited in this application.

In addition, in some implementations, the shielding film may alternatively include a multi-layer film structure. For example, the shielding film may include a first film layer and a second film layer that are disposed in a stacked manner. In an example implementation, a specific structure or a manufacturing manner of the second film layer may be the same as or different from a structure of the first film layer.

In some implementations, a relative position relationship between the first film layer and the second film layer may be varied. For example, the structures of the first film layer and the second film layer may be the same, the first conductive part in the first film layer may be staggered with the second conductive part in the second film layer, and the first insulating part in the first film layer may be staggered with the second insulating part in the second film layer. This may also be understood as meaning that a projection of the first conductive part in the first film layer on the second film layer does not coincide with the second conductive part, and a projection of the first insulating part in the first film layer on the second film layer does not coincide with the second insulating part.

In some implementations, the first conductive part in the first film layer may be disposed corresponding to the second insulating part in the second film layer, and the first insulating part in the first film layer may be disposed corresponding to the second conductive part in the second film layer. In other words, the first film layer and the second film layer are complementary. For example, when the first insulating part in the first film layer is a plurality of through holes disposed on the first conductive part, the second conductive part in the second film layer may be a plurality of conductors distributed on the second insulating part. In an example implementation, a contour of the second conductive part in the second film layer may be less than, equal to, or greater than a contour of the first insulating part in the first film layer. For example, the first insulating part may be a circular hole structure, the second conductive part may be a circular conductor, and a diameter of the first insulating part may be less than, equal to, or greater than a diameter of the second conductive part.

In an example implementation, to improve shielding performance of the shielding film, the contour of the first insulating part may be not greater than the contour of the second conductive part, or a projection of the second conductive part on the first film layer may cover the first insulating part.

In some implementations, the shielding film may alternatively include more first film layers or second film layers that are disposed in a stacked manner, and structures of the plurality of film layers may be the same or different.

According to another aspect, an embodiment of this application further provides a coil assembly, including an inductor coil and any one of the foregoing shielding films. The shielding film may be earthed and disposed on at least one side of the inductor coil, to process or filter an electromagnetic signal generated by the inductor coil, or process or filter an electromagnetic signal in an external environment, thereby preventing the electromagnetic signal in the external environment from affecting the inductor coil.

In specific application, the coil assembly may be applied to a power supply device, or may be applied to a power receiving device.

For example, when the coil assembly is applied to the power supply device (such as a wireless charger), the coil assembly may further include a power supply circuit. A power supply in the power supply device is electrically connected to the inductor coil by using the power supply circuit, and is configured to supply an alternating current to the inductor coil, so that the inductor coil generates an alternating magnetic field (or an electromagnetic signal), to convert electric energy into electromagnetic energy for wireless power transmission of the electric energy. The shielding film may be disposed on one side of the inductor coil, to filter a high-frequency electromagnetic signal generated by the inductor coil. A low-frequency signal generated by the inductor coil may be transmitted through the shielding film, so that the power receiving device can receive electromagnetic energy generated by the coil assembly (the power supply device).

When the coil assembly is applied to the power receiving device (such as a mobile phone), the coil assembly may further include a power receiving circuit. A power supply (such as a lithium battery) in the power receiving device may be electrically connected to the inductor coil by using the power receiving circuit. When receiving electromagnetic energy, the inductor coil can convert the electromagnetic energy into electric energy, and the electric energy can flow into the power supply through the power receiving circuit for storage.

In some implementations, the shielding film may alternatively be independently applied to an electronic device. For example, an electronic device provided in this application includes a housing and an electrical component located in the housing. The shielding film may be disposed on a part of a periphery of the electrical component, to filter a high-frequency electromagnetic signal generated by the electrical component, or filter a high-frequency electromagnetic signal from the outside, thereby preventing the electrical component from being affected. During specific implementation, the electrical component may be a processor, a memory, or the like, and the shielding film may be disposed only on a part of the periphery of the electrical component, or may cover the periphery of the electrical component. In addition, the electronic device may be a mobile phone, a smartwatch, a power adapter, or the like. This is not specifically limited in this application.

DESCRIPTION OF EMBODIMENTS

To make objectives, technical solutions, and advantages of this application clearer, the following further describes example embodiments of this application in detail with reference to the accompanying drawings.

To facilitate understanding of a shielding film provided in embodiments of this application, the following first describes an application scenario of the shielding film.

Figure 1:
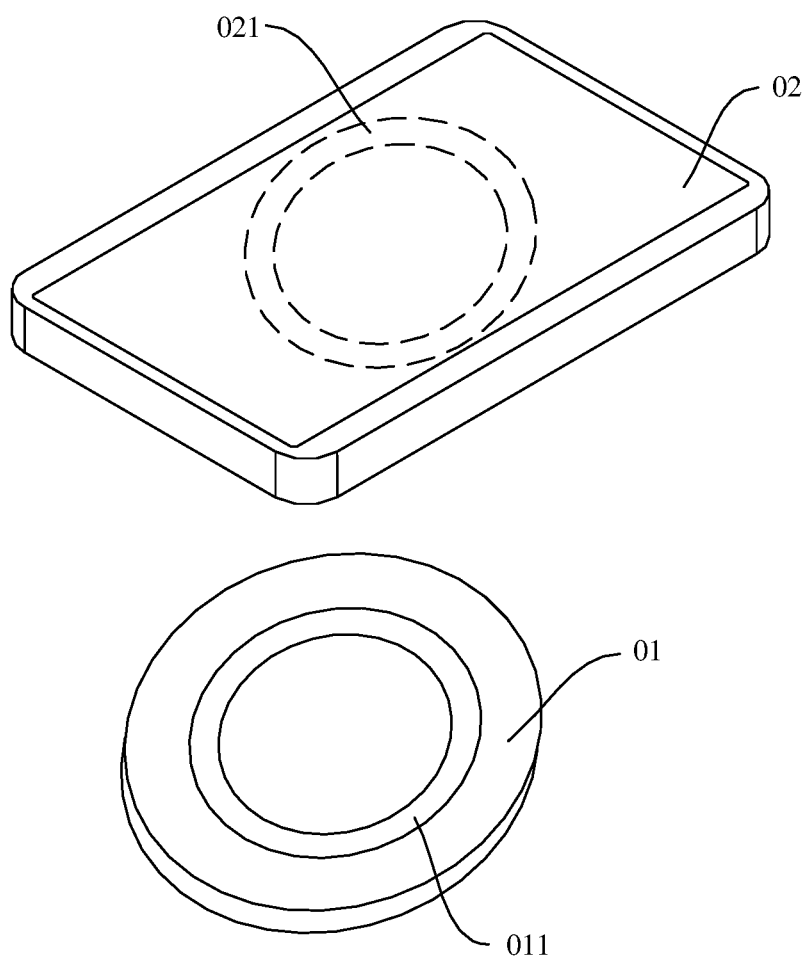
FIG. 1 is a schematic structural diagram of a wireless charger and a mobile phone according to an embodiment of this application.

The shielding film provided in the embodiments of this application may be applied to a plurality of types of devices that need to selectively shield an electromagnetic signal. For example, with the development of wireless charging technologies, increasingly more electronic products (such as a mobile phone and a smartwatch) begin to use a wireless charging technology to implement electric power transmission. Implementation of the wireless charging technology mainly relies on an electromagnetic induction principle to implement electric energy transmission. For example, as shown in FIG. 1, a wireless charger 01 may be used as a transmit end, and a mobile phone 02 may be used as a receive end. A power supply coil 011 may be disposed in the wireless charger 01, and a power receiving coil 021 may be disposed in the mobile phone 02. An alternating current is provided in the power supply coil 011, and the power supply coil 011 sends an electromagnetic signal to the outside through electromagnetic induction. After receiving the electromagnetic signal, the power receiving coil 021 converts the electromagnetic signal into a current through electromagnetic induction, to achieve the purpose of wireless charging.

In actual application, electromagnetic signals generated by the transmit end generally include a high-frequency electromagnetic signal (such as an electromagnetic signal whose frequency is greater than 100 kHz) and a low-frequency electromagnetic signal (such as an electromagnetic signal whose frequency is not greater than 100 kHz). In a wireless charging system, electric energy transmission is mainly implemented by using the low-frequency electromagnetic signal, and the high-frequency electromagnetic signal makes little contribution to electric energy transmission. In addition, high-frequency electromagnetic signals of some frequency bands may further have an adverse effect on an electrical component (such as a processor) or human bodies. Therefore, the high frequency electromagnetic signals need to be suppressed.

In some wireless charging systems, to suppress a high-frequency signal, a power filter may be disposed at the transmit end to filter out a high-frequency alternating current, thereby suppressing a high-frequency electromagnetic signal. Specifically, at the transmit end, a high-frequency electromagnetic signal generated by the power supply coil is generated by a high-frequency alternating current. Therefore, to reduce high-frequency electromagnetic signals generated by the power supply coil, a high-frequency current in the high-frequency alternating current may be filtered out by using the power filter, to suppress the high frequency electromagnetic signals. However, in this manner, due to introduction of the power filter, a volume of the transmit end increases, which is not conducive to miniaturization, lightening, and thinning design of the transmit end, and manufacturing costs also increase.

In addition, in some implementations, to increase the charging rate, power of transmitting a high-frequency alternating current at the transmit end may be increased. However, because resistance exists in the power filter, an electrical signal flowing through the power filter is obviously suppressed, and energy attenuation is severe. This greatly reduces electromagnetic energy conversion efficiency, which is not conducive to improvement in the charging rate.

Based on the foregoing problem, the embodiments of this application provide a shielding film that is conducive to improvement in the charging rate, can effectively filter out a high-frequency electromagnetic signal, has low manufacturing costs, and is convenient for miniaturization, lightening, and thinning during manufacturing, and a coil assembly and a wireless charging device that use the shielding film.

For ease of understanding of the technical solutions in this application, the following specifically describes the shielding film provided in this application with reference to the accompanying drawings and specific implementations.

Terms used in the following embodiments are merely for the purpose of describing specific embodiments, but are not intended to limit this application. As used in the specification and appended claims of this application, the singular expressions "a", "an", "the above", "the" and "this" are intended to also include expressions such as "one or more", unless the contrary is clearly indicated in its context. It should be further understood that in the following embodiments of this application, "at least one" and "one or more" refer to one, two, or more. The term "and/or" is used to describe an association relationship of an associated object, and indicates that there may be three relationships. For example, A and/or B may represent a case in which only A exists, both A and B exist, and only B exists, where A and B may be singular or plural. The character "/" generally indicates an "or" relationship between the associated objects.

Reference to "an embodiment", "some embodiments", or the like described in this specification means that one or more embodiments of this application include specific features, structures, or characteristics described in combination with the embodiment. Therefore, statements such as "in an embodiment", "in some embodiments", "in some other embodiments", and "in other embodiments" that appear at different locations in this specification do not necessarily refer to a same embodiment, but means "one or more, but not all embodiments" unless otherwise specifically emphasized. Terms "include", "have", and their variants all mean "including but not limited to", unless otherwise specifically emphasized.

Figure 2:
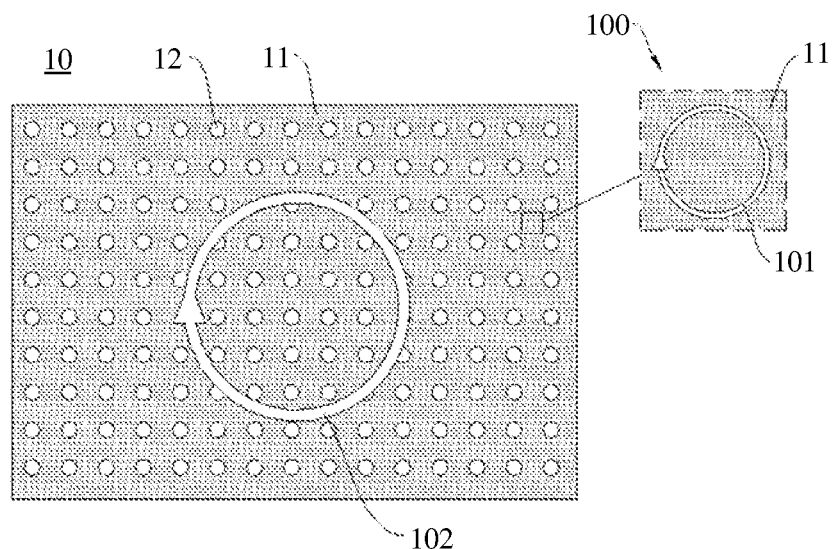
FIG. 2 is a schematic structural diagram of a shielding film according to an embodiment of this application.
Figure 3:
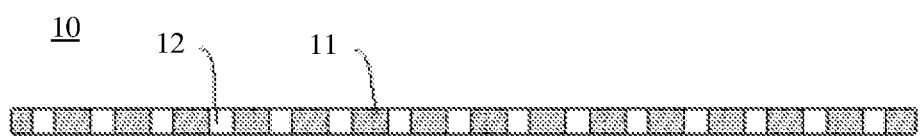
FIG. 3 is a schematic cross-sectional structural diagram of a shielding film according to an embodiment of this application.

As shown in FIG. 2, in an embodiment provided in this application, a shielding film 10 includes a conductive part 11 and an insulating part 12. Referring to FIG. 3, the insulating part 12 penetrates the conductive part 11 in a thickness direction of the shielding film 10. Under the influence of a magnetic field of an electromagnetic field (for example, when there is an electromagnetic coil generating an electromagnetic field on one side of the shielding film 10), an eddy current is generated in the shielding film 10. Specifically, after the shielding film 10 is placed in the electromagnetic field, an induced current is generated in the shielding film, and the induced current forms a loop in the shielding film. Because a path of the loop is similar to an eddy, the current is referred to as an eddy current. Generally, electromagnetic fields generated by the electromagnetic coil include a high-frequency electromagnetic field and a low-frequency electromagnetic field. In electromagnetic fields with different frequencies, eddy current loops formed in the shielding film are different in size. Specifically, in the high-frequency electromagnetic field, a loop path of an eddy current formed in the shielding film 10 is small. In the low-frequency electromagnetic field, a loop path of an eddy current formed in the shielding film 10 is large. Based on the foregoing feature, the shielding film 10 provided in this embodiment of this application can effectively absorb and shield a high-frequency electromagnetic field, and can well conduct a low-frequency electromagnetic field. Specifically, in a high-frequency electromagnetic field (a first electromagnetic field), a first eddy current 101 is formed in the shielding film 10, and a loop of the first eddy current 101 is located in the conductive part 11. In this case, loop impedance is relatively low, and an eddy current loss is high. Therefore, the first electromagnetic field can be effectively absorbed and shielded. In a low-frequency electromagnetic field (a second electromagnetic field), a second eddy current 102 is formed in the shielding film 10, and a loop of the second eddy current 102 passes through the insulating part 12. In this case, loop impedance is relatively high, and an eddy current loss is relatively low. Therefore, no obvious shielding effect is formed on the low-frequency electromagnetic field.

In an example implementation, the conductive part 11 may be made of various materials, for example, may include a metal or an alloy such as copper or aluminum, or may include graphene or carbon fiber. The insulating part 12 may also be made of various materials, for example, may include air, polyamide, polycarbonate, tetrafluoroethylene, polytetrafluoroethylene, or a mixture of a plurality of insulating materials.

In addition, in an example implementation, a quantity of conductive parts 11, a quantity of insulating parts 12, a structural form of the shielding film 10, and a manner of forming a conductive unit are varied.

For example, as shown in FIG. 2 and FIG. 3, in an embodiment provided in this application, the conductive part 11 may be an entire body, and the insulating part 12 may be a plurality of through-hole structures disposed on the conductive part 11. During manufacturing, a metal film, conductive paper, carbon fiber felt, or the like may be selected as a substrate, and then a through-hole structure is disposed on the substrate by using a process such as needling or laser etching, to implement preparation of the shielding film 10. A minimum region surrounded by a plurality of insulating parts 12 may be used as a conductive unit 100 (only one is indicated in FIG. 2). For example, a plurality of insulating parts 12 may be evenly distributed in the shielding film 10 (the conductive part 11) in a matrix form, and every four insulating parts 12 may surround one conductive unit 100. During specific implementation, the through hole may be a circular hole, an elliptical hole, or another polygonal hole structure. In addition, parameters such as a quantity, a size, distribution density, and spacing of the insulating parts 12 (through holes) may be adaptively adjusted based on an actual situation. For example, when a frequency of an electromagnetic field to be shielded is relatively high, the distribution density of the insulating parts 12 may be appropriately increased, or the size of the insulating part 12 may be appropriately reduced. This is not specifically limited in this application.

In addition, in some implementations, an insulating material may be added to the through hole, to improve structural stability and structural performance of the shielding film 10. For example, the through hole may be filled with insulating glue or another insulating material.

Figure 4:
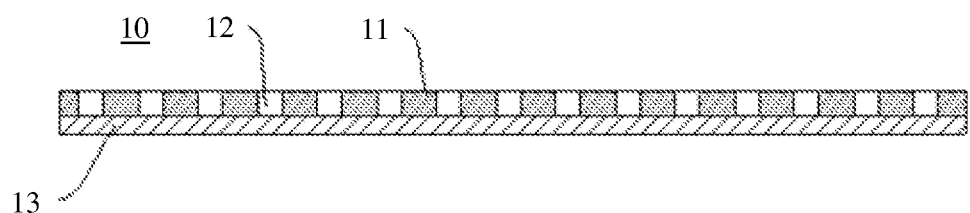
FIG. 4 is a schematic cross-sectional structural diagram of another shielding film according to an embodiment of this application.

In some other implementations, as shown in FIG. 4, an insulation layer 13 may be further disposed on a surface of the shielding film 10, to improve structural performance of the shielding film 10. During specific implementation, the insulation layer 13 may be disposed on a lower surface of the shielding film 10, or may be disposed on an upper surface of the shielding film 10, or may be disposed on both the upper and lower surfaces of the shielding film 10.

Alternatively, in some implementations, when there is an eddy current in the conductive unit 100, the conductive unit 100 heats up. Therefore, to ensure normal working performance of the shielding film 10, a material with relatively high heat resistance may be selected for the insulating part 12, to avoid a bad status of the insulating part 12 such as degraded insulation performance or a changed physical property (for example, melted) when a temperature is relatively high, thereby ensuring normal shielding performance and structural stability of the shielding film 10.

In some implementations, to improve heat dissipation performance of the shielding film 10, a thermally conductive insulation layer may be disposed on a surface of the shielding film 10. In an example implementation, a material of the thermally conductive insulation layer may include thermally conductive silicone, thermally conductive silica gel, or the like.

Figure 5:
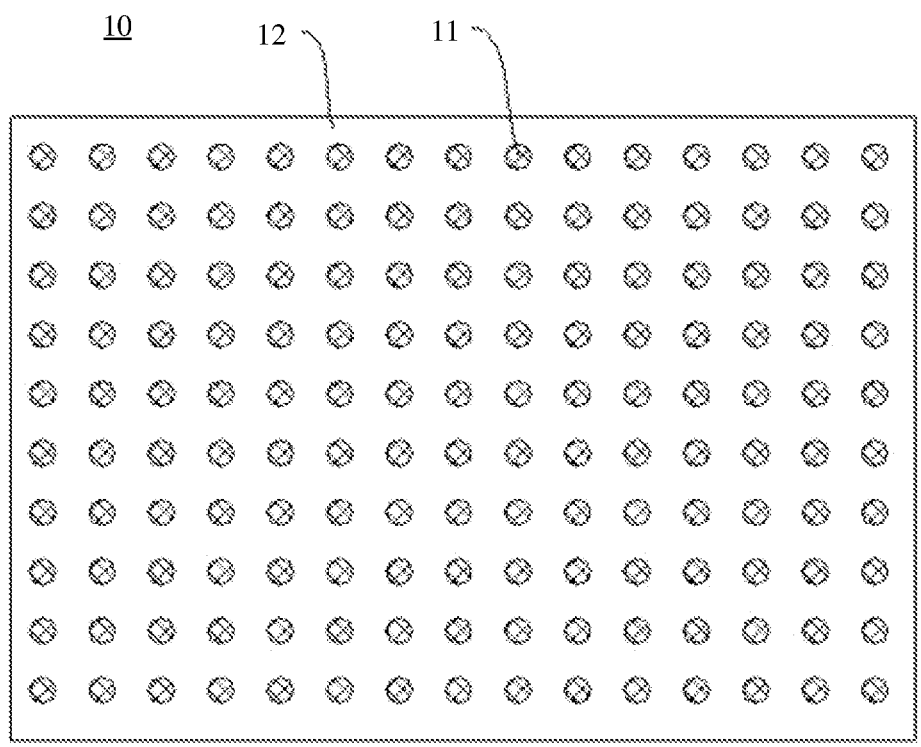
FIG. 5 is a schematic structural diagram of another shielding film according to an embodiment of this application.

In addition, in some implementations, the conductive parts 11 in the shielding film 10 may alternatively be a plurality of mutually independent structures. For example, as shown in FIG. 5, in an embodiment provided in this application, the shielding film 10 may include one insulating part 12 and a plurality of conductive parts 11. The plurality of conductive parts 11 are dispersed in the insulating part 12, and each conductive part 11 may be used as one conductive unit.

During manufacturing, a plurality of conductive parts 11 (such as metal blocks) may be placed on a platform, and then an insulating coating may be directly sprayed on the platform by using a spraying process, to combine the conductive parts 11 and the insulating part 12. Then, the insulating part 12 may be cured by using a process such as ultraviolet curing (UV curing), to complete preparation of the shielding film 10. In an example implementation, parameters such as a size and distribution density of the conductive parts 11 may be adaptively adjusted based on an actual situation. For example, when a frequency of an electromagnetic field to be shielded is relatively high, the distribution density of the conductive parts 11 may be appropriately increased. This is not specifically limited in this application.

Figure 6:
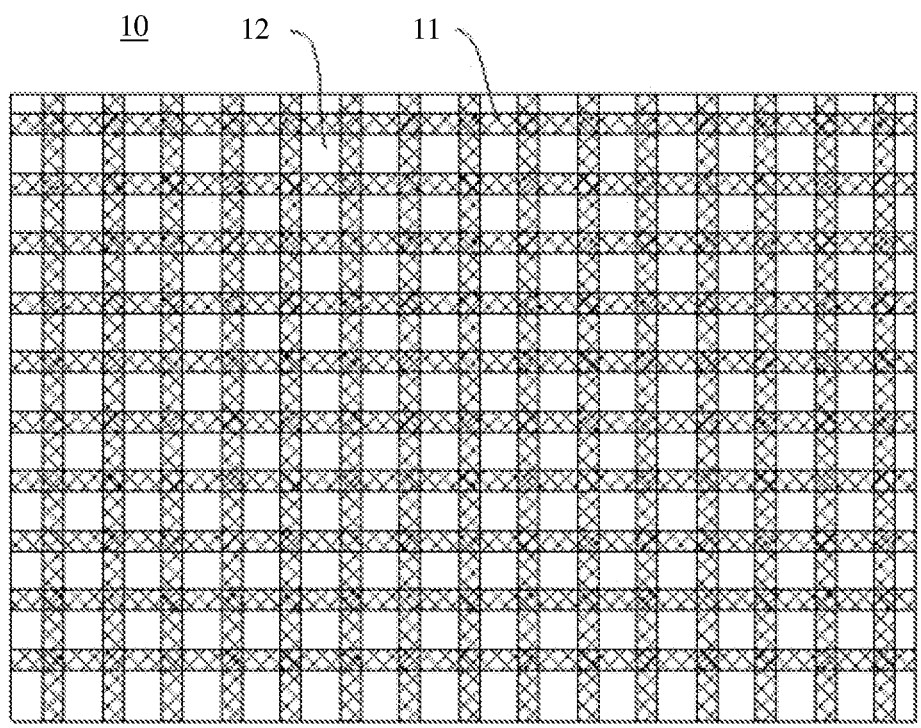
FIG. 6 is a schematic structural diagram of still another shielding film according to an embodiment of this application.

In some implementations, the shielding film 10 may alternatively be manufactured by using a weaving process. For example, as shown in FIG. 6, metal wires may be woven into a mesh structure, a hollow-out part of the mesh structure may be used as an insulating part 12, and metal wires around each insulating part 12 may form one conductive unit. During specific implementation, the mesh structure (or the hollow-out part) may be a rectangular structure, a rhombus structure, or the like. This is not specifically limited in this application.

In addition, in some implementations, an insulating material, a thermally conductive insulating material, or the like may be further coated on a surface of the mesh structure, to improve structural strength or heat dissipation performance of the shielding film 10. In addition, in some implementations, a metal wire wrapped with an insulation layer or a thermally conductive insulation layer may be selected as a woven material, or an insulating wire wrapped with a conductive layer may be selected as a woven material. This is not specifically limited in this application.

In addition, in some implementations, the shielding film 10 may alternatively be a multi-layer shielding structure, or a plurality of shielding films 10 may be disposed in a stacked manner to form a shielding film 10 with a multi-layer shielding structure.

Figure 7:
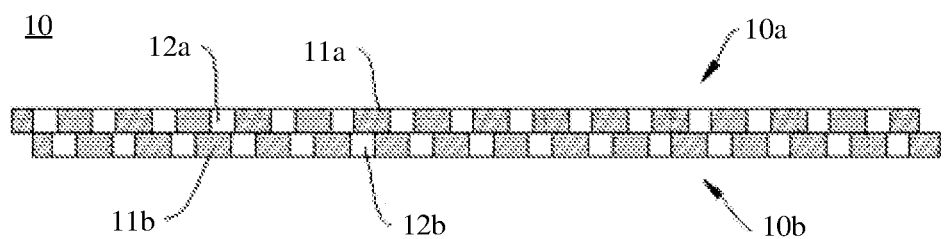
FIG. 7 is a schematic cross-sectional structural diagram of another shielding film according to an embodiment of this application.

For example, as shown in FIG. 7, in an embodiment provided in this application, the shielding film 10 includes a two-layer shielding structure. Specifically, the shielding film 10 may include a first film layer 10a and a second film layer 10b that are disposed in a stacked manner. The first film layer 10a may include a first conductive part 11a and a first insulating part 12a, and the first insulating part 12a penetrates the first conductive part 11a in a thickness direction of the first film layer 10a. The second film layer 10b may include a second conductive part 11b and a second insulating part 12b, and the second insulating part 12b penetrates the second conductive part 11b in a thickness direction of the second film layer 10b. In an example implementation, a specific structure or a manufacturing manner of the first film layer 10a may be the same as or different from a structure of the shielding film 10 with a single-layer shielding structure in the foregoing embodiment. A specific structure or a manufacturing manner of the second film layer 10b may be the same as or different from a structure of the shielding film 10 with a single-layer shielding structure in the foregoing embodiment.

In some implementations, a relative position relationship between the first film layer 10a and the second film layer 10b may be varied.

For example, as shown in FIG. 7, the structures of the first film layer 10a and the second film layer 10b may be the same, the first conductive part 11a in the first film layer 10a may be staggered with the second conductive part 11b in the second film layer 10b, and the first insulating part 12a in the first film layer 10a may be staggered with the second insulating part 12b in the second film layer 10b. This may also be understood as a meaning that a projection of the first conductive part 11a in the first film layer 10a on the second film layer 10b does not coincide with the second conductive part 11b, and a projection of the first insulating part 12a in the first film layer 10a on the second film layer 10b does not coincide with the second insulating part 12b.

Figure 8:
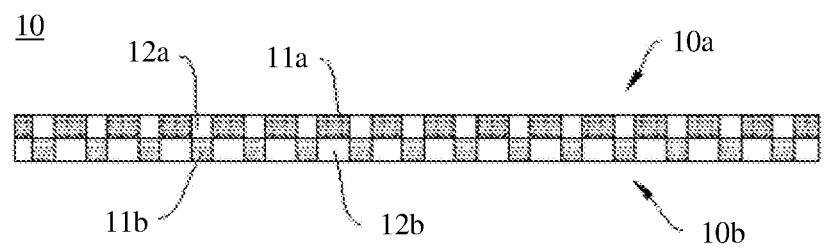
FIG. 8 is a schematic cross-sectional structural diagram of another shielding film according to an embodiment of this application.

As shown in FIG. 8, in some implementations, the first conductive part 11a in the first film layer 10a may be disposed corresponding to the second insulating part 12b in the second film layer 10b, and the first insulating part 12a in the first film layer 10a may be disposed corresponding to the second conductive part 11b in the second film layer 10b. In other words, the first film layer 10a and the second film layer 10b may be complementary. For example, when the first insulating part 12a in the first film layer 10a is a plurality of through holes disposed on the first conductive part 11a, the second conductive part 11b in the second film layer 10b may be a plurality of conductors distributed on the second insulating part 12b. In an example implementation, a contour of the second conductive part 11b in the second film layer 10b may be less than, equal to, or greater than a contour of the first insulating part 12a in the first film layer 10a. For example, the first insulating part 12a may be a circular hole structure, the second conductive part 11b may be a circular conductor, and a diameter of the first insulating part 12a may be less than, equal to, or greater than a diameter of the second conductive part 11b.

In an example implementation, to improve shielding performance of the shielding film 10, the contour of the first insulating part 12a may be not greater than the contour of the second conductive part 11b. Specifically, when the shielding film 10 implements a shielding function, some high-frequency electromagnetic signals pass through the first conductive part 11a in the first film layer 10a to form an eddy magnetic field, to effectively absorb and shield these high-frequency electromagnetic signals. Other high-frequency electromagnetic signals pass through the first insulating part 12a in the first film layer 10a, and when these high-frequency electromagnetic signals pass through the second conductive part 11b in the second film layer 10b, an eddy magnetic field is formed, to effectively absorb and shield these high-frequency electromagnetic signals. Therefore, the shielding film 10 can have a good shielding function.

Figure 9:
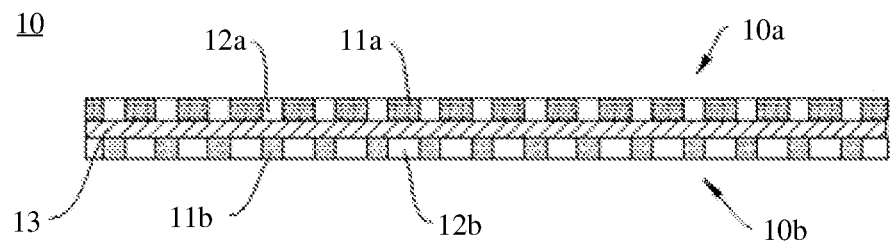
FIG. 9 is a schematic cross-sectional structural diagram of still another shielding film according to an embodiment of this application.

In addition, during specific implementation, to prevent the first conductive part 11a in the first film layer 10a from being electrically connected to the second conductive part 11b in the second film layer 10b to affect transmission of a low-frequency electromagnetic signal, as shown in FIG. 9, in some implementations, an insulation layer 13 may be disposed between the first film layer 10a and the second film layer 10b. In addition, in some implementations, to improve heat dissipation performance of the shielding film 10, a thermally conductive insulation layer may be disposed between the first film layer 10a and the second film layer 10b; or a thermally conductive insulation layer may be disposed on both an upper surface of the first film layer 10a and a lower surface of the second film layer 10b.

In actual application, the shielding film 10 can be conveniently and efficiently applied in various environments in which a high-frequency electromagnetic signal (electromagnetic field) needs to be shielded and a low-frequency electromagnetic signal (electromagnetic field) needs to be effectively transmitted.

Figure 10:
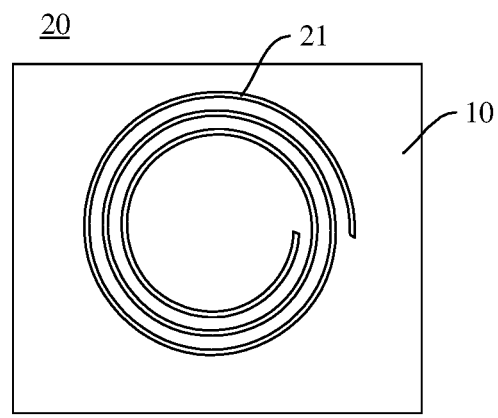
FIG. 10 is a schematic structural diagram of a coil assembly according to an embodiment of this application.

For example, as shown in FIG. 10, an embodiment of this application further provides a coil assembly 20, including an inductor coil 21 and any one of the shielding films 10 in the foregoing embodiments. The shielding film 10 may be disposed on at least one side of the inductor coil 21, to process or filter an electromagnetic signal generated by the inductor coil 21. Specifically, the coil assembly 20 may further include a power supply circuit. The power supply circuit is electrically connected to the inductor coil 21, and is configured to supply an alternating current to the inductor coil 21, so that the inductor coil 21 generates an alternating magnetic field (or an electromagnetic signal), to convert electric energy into electromagnetic energy for wireless power transmission. The shielding film 10 may be disposed on one side of the inductor coil 21, to filter a high-frequency electromagnetic signal generated by the inductor coil 21.

During specific implementation, a position relationship between the shielding film 10 and the inductor coil 21 may be varied.

Figure 11:
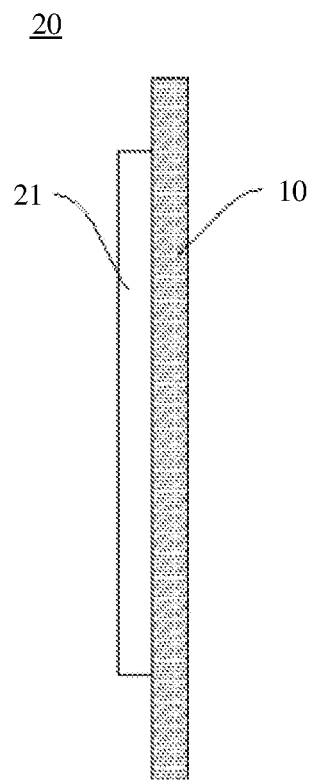
FIG. 11 is a schematic cross-sectional structural diagram of a coil assembly according to an embodiment of this application.

For example, as shown in FIG. 11, when a right end of the inductor coil 21 is used as an output end, the shielding film 10 may be disposed on a right side of the inductor coil 21. In some implementations, the shielding film 10 may alternatively cover left and right sides or a periphery of the inductor coil 21.

In specific application, the coil assembly 21 may be disposed in a power supply device, or may be disposed in a power receiving device.

For example, the power supply device may be a wireless charger, and the coil assembly 21 may be electrically connected to a power supply circuit in the power supply device, to convert electric energy into electromagnetic energy for wireless power transmission. The power receiving device may be a mobile phone, a smartwatch, a tablet computer, or the like. The coil assembly 21 may be electrically connected to a power receiving circuit in the power receiving device, to convert electromagnetic energy into electric energy for storage or use.

Figure 12:
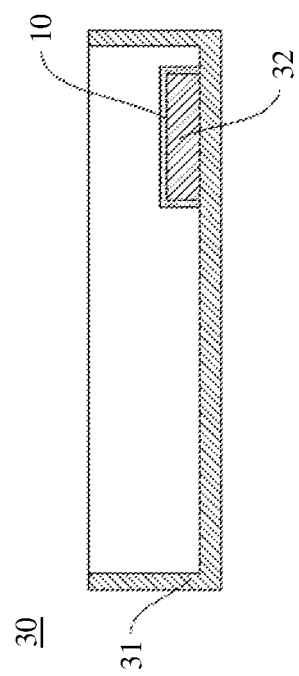
FIG. 12 is a schematic cross-sectional structural diagram of a wireless charging device according to an embodiment of this application.

In addition, in some implementations, the shielding film 10 may alternatively be independently applied to an electronic device. For example, as shown in FIG. 12, a wireless charging device provided in this application includes a housing 31 and at least one electrical component 32 (only one electrical component 32 is shown in FIG. 12) located in the housing 31. The shielding film 10 may be disposed on at least a part of a periphery of the electrical component 32, to filter a high-frequency electromagnetic signal generated by the electrical component 32, or filter a high-frequency electromagnetic signal from the outside, thereby preventing the high-frequency electromagnetic signal generated by the outside from affecting the electrical component 32.

In an example implementation, the electrical component 32 may be a processor, a memory, or the like, and the shielding film 10 may be disposed only on a part of the periphery of the electrical component 32, or may cover the entire periphery of the electrical component 32. In addition, the wireless charging device may be a mobile phone, a smartwatch, a power adapter, or the like. This is not specifically limited in this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A shielding film comprising a first film layer, wherein the first film layer comprises a first conductive part and a first insulating part, and the first insulating part penetrates the first conductive part or the first conductive part penetrates the first insulating part in a thickness direction of the first film layer;
   under the influence of a magnetic field of a first electromagnetic field, a first eddy current is formed in the first film layer, and a loop of the first eddy current is located in the first conductive part; and under the influence of a magnetic field of a second electromagnetic field, a second eddy current is formed in the first film layer, and a loop of the second eddy current passes through the first insulating part; and
   a loop area of the first eddy current is less than a loop area of the second eddy current,
   wherein the first insulating part constitutes a main part of the first film layer, a plurality of first conductive parts are disposed in the first film layer, and the plurality of first conductive parts penetrate the first insulating part in the thickness direction of the first film layer.

2. The shielding film according to claim 1, further comprising a second film layer, wherein
   the second film layer comprises a second conductive part and a second insulating part, and the second insulating part penetrates the second conductive part in a thickness direction of the second film layer;
   the second film layer is attached to a side surface of the first film layer, and a projection of the second conductive part on the first film layer covers the first insulating part; and
   under the influence of the magnetic field of the first electromagnetic field, a third eddy current is formed in the second film layer, and a loop of the third eddy current is located in the second conductive part; and under the influence of the magnetic field of the second electromagnetic field, a fourth eddy current is formed in the second film layer, and a loop of the fourth eddy current passes through the second insulating part.

3. The shielding film according to claim 2, wherein the second conductive part constitutes a main part of the second film layer, a plurality of second insulating parts are disposed in the second film layer, and the plurality of second insulating parts penetrate the second conductive part in the thickness direction of the second film layer.

4. The shielding film according to claim 2, wherein the second insulating part constitutes a main part of the second film layer, a plurality of second conductive parts are disposed in the second film layer, and the plurality of second conductive parts penetrate the second insulating part in the thickness direction of the second film layer.

5. The shielding film according to claim 2, wherein the second film layer comprises any one of carbon fiber felt, a metal film, conductive paper, and a woven mesh.

6. The shielding film according to claim 2, wherein the second insulating part constitutes a main part of the second film layer, a plurality of second conductive parts are disposed in the second film layer, and the plurality of second conductive parts penetrate the second insulating part in the thickness direction of the second film layer.

7. The shielding film according to claim 1, wherein the first film layer comprises any one of carbon fiber felt, a metal film, conductive paper, or a woven mesh.

8. The shielding film according to claim 1, further comprising a thermally conductive insulation layer, wherein the thermally conductive insulation layer is attached to at least one side surface of the first film layer.

9. A coil assembly, comprising an inductor coil and the shielding film according to claim 1, wherein
the shielding film is earthed and disposed on at least one side of the inductor coil; and
the inductor coil is configured to generate the first electromagnetic field and the second electromagnetic field.

10. An electronic device comprising a housing and an electrical component located in the housing, and further comprising a shielding film,
wherein the shielding film comprises a first film layer comprising a first conductive part and a first insulating part,
wherein under the influence of a magnetic field of a first electromagnetic field, a first eddy current is formed in the first film layer, and a loop of the first eddy current is located in the first conductive part; and under the influence of a magnetic field of a second electromagnetic field, a second eddy current is formed in the first film layer, and a loop of the second eddy current passes through the first insulating part,
wherein a loop area of the first eddy current is less than a loop area of the second eddy current, and
wherein
the shielding film is disposed on at least a part of a periphery of the electrical component,
wherein the first insulating part constitutes a main part of the first film layer, a plurality of first conductive parts are disposed in the first film layer, and the plurality of first conductive parts penetrate the first insulating part in the thickness direction of the first film layer.

11. A shielding film comprising a first film layer, wherein
the first film layer comprises a first conductive part and a first insulating part, and the first insulating part penetrates the first conductive part or the first conductive part penetrates the first insulating part in a thickness direction of the first film layer;
under the influence of a magnetic field of a first electromagnetic field, a first eddy current is formed in the first film layer, and a loop of the first eddy current is located in the first conductive part; and under the influence of a magnetic field of a second electromagnetic field, a second eddy current is formed in the first film layer, and a loop of the second eddy current passes through the first insulating part; and
a loop area of the first eddy current is less than a loop area of the second eddy current,
further comprising a second film layer, wherein
the second film layer comprises a second conductive part and a second insulating part, and the second insulating part penetrates the second conductive part in a thickness direction of the second film layer;
the second film layer is attached to a side surface of the first film layer, and a projection of the second conductive part on the first film layer covers the first insulating part; and
under the influence of the magnetic field of the first electromagnetic field, a third eddy current is formed in the second film layer, and a loop of the third eddy current is located in the second conductive part; and under the influence of the magnetic field of the second electromagnetic field, a fourth eddy current is formed in the second film layer, and a loop of the fourth eddy current passes through the second insulating part,
wherein the second insulating part constitutes a main part of the second film layer, a plurality of second conductive parts are disposed in the second film layer, and the plurality of second conductive parts penetrate the second insulating part in the thickness direction of the second film layer.

* * * * *